(12) United States Patent
Holch et al.

(10) Patent No.: US 8,690,043 B2
(45) Date of Patent: Apr. 8, 2014

(54) REDUCIBLE CARTON WITH LOCKING AND RECLOSURE FEATURES

(75) Inventors: Frederick R. Holch, Batavia, IL (US); Nicholas A. Philips, Sugar Grove, IL (US)

(73) Assignee: International Paper Company, Memphis, TN (US)

( * ) Notice: Subject to any disclaimer, the term of this patent is extended or adjusted under 35 U.S.C. 154(b) by 565 days.

(21) Appl. No.: 12/760,981

(22) Filed: Apr. 15, 2010

(65) Prior Publication Data

US 2011/0253772 A1    Oct. 20, 2011

(51) Int. Cl.
*B65D 5/355*   (2006.01)
*B65D 5/54*    (2006.01)

(52) U.S. Cl.
USPC ........................................ 229/101.2; 229/906

(58) Field of Classification Search
USPC ........ 229/101.2, 101.1, 210, 115, 122.3, 902, 229/103, 107; 206/551, 218
See application file for complete search history.

(56) References Cited

U.S. PATENT DOCUMENTS

| | | | |
|---|---|---|---|
| 879,488 A * | 2/1908 | Pitkin | 229/112 |
| 3,167,240 A | 1/1965 | Collura et al. | |
| 3,310,220 A | 3/1967 | Feldman | |
| 4,136,817 A * | 1/1979 | Perry | 229/101 |
| 4,817,803 A | 4/1989 | Risucci | |
| 5,071,062 A * | 12/1991 | Bradley et al. | 229/109 |
| 5,110,038 A | 5/1992 | Pantisano et al. | |
| 5,305,949 A | 4/1994 | Linden | |
| 5,669,493 A | 9/1997 | Focke et al. | |
| 5,713,509 A | 2/1998 | Correll | |
| 5,806,755 A | 9/1998 | Correll | |
| 5,836,451 A | 11/1998 | Dixon | |
| 5,881,948 A | 3/1999 | Correll | |
| 6,206,277 B1 | 3/2001 | Correll | |
| 6,375,066 B1 * | 4/2002 | Ritter | 229/101.2 |
| 6,440,050 B1 * | 8/2002 | Capparelli et al. | 493/59 |
| 7,004,377 B2 | 2/2006 | Metcalf | |
| 7,051,919 B1 | 5/2006 | Walsh | |
| 7,261,231 B2 | 8/2007 | Kuhn et al. | |
| 7,407,088 B2 | 8/2008 | Hafkin et al. | |
| 7,628,311 B2 | 12/2009 | Kuhn et al. | |
| 2003/0121961 A1 | 7/2003 | Pilgrim et al. | |

* cited by examiner

*Primary Examiner* — Gary Elkins
*Assistant Examiner* — Christopher Demeree
(74) *Attorney, Agent, or Firm* — Matthew M. Eslami

(57) ABSTRACT

The present invention is directed to a reducible carton formed from a one-piece unitary blank of material. The reducible carton comprises a top wall, a bottom wall, opposite side walls, a front wall and a back wall. Means enabling the reducible carton to transversely separate it into a reusable rear carton component and a discardable front carton component. The reusable carton component comprises the back wall and a rear portion of each of the top wall, the bottom wall and the side walls, wherein the rear top wall portion, the rear bottom wall portion and the rear side wall portions in the reusable carton component each terminate in a forward edge defining an open forward end of the reusable carton component. The forward edge of one of the rear top wall portion or the rear bottom wall portion defines a seal flap that is foldable into closing relationship over the open forward end of the reusable carton component. The seal flap has a locking tab on a free edge thereof. The forward edge of the other of the rear top wall portion or the rear bottom wall portion includes a recess therein for frictionally receiving the locking tab to lock the seal flap in closed position.

13 Claims, 10 Drawing Sheets

REDUCIBLE CARTON WITH LOCKING AND RECLOSURE FEATURES

FIELD OF THE INVENTION

The present invention relates generally to paperboard containers or cartons that are capable of shipping articles, and more particularly, to foldable one-piece containers or cartons for packaging and storing relatively flat food, such as pizza pies or the like.

BACKGROUND OF THE INVENTION

Takeout pizza is often not consumed in one sitting. There are usually leftovers which are kept in the box or stored in a separate container and put into a refrigerator. These are not optimal storage means, however. Wrapping and placing leftover pizza in a different container is messy, inconvenient, and wasteful. Likewise, using the pizza box itself for storage is difficult, due to the tight storage constraints of an average refrigerator.

Designers have attempted to produce reducible cartons for pizza pies by using full-sized pizza boxes that can be torn in two along pre-scored lines. See for example, U.S. Pat. No. 5,071,062. This patent describes a pizza carton or container having a removable upper lid and a lower portion that is foldable upon itself to result in a reduced size storage container. This particular container, however, is difficult to use, since it requires the user to fold the lower portion along lines that may be saturated with food oil or covered with crumbs or other food residue.

Thus, a need exists for a pizza carton that is easy to reduce. Ideally, the carton should initially have a traditional pizza box shaped with reducibility features that do not hamper its functionality in any way. The setup and strength of the container should not be affected by the reducibility features, either. In an optimal arrangement, the leftover pizza need only be shifted to one side of the box and the container reduced in size without having to remove the pizza from the box. This should also be accomplished without requiring the user to fold the constituent board material along complicated lines and/or lines likely to have been saturated with food. The present invention is directed to fulfilling these needs and others as described below.

SUMMARY OF THE INVENTION

Although the present invention will be described as pertaining to a pizza box, but the invention should not be limited to that extent. The principles are applicable to any box or container or carton that can be converted to a smaller size for storing an object. The carton or container or the pizza box is manually constructed from a single blank. The reducible carton is transversely separable into a reusable rear carton component and a discardable front carton component.

Some advantages of the present invention pizza box or container are the neatness, speed and ease in the reduction of the container to store left-over pizza slices. The container or the pizza box provides the user with a reduced size storage container or reusable container for the unconsumed portion of the product and maintains the integrity of the original container or box prior to the container or box being divided. It also provides an intuitive and easy to use locking system for the reusable container used to store the unconsumed portion of the product and avoids the need to remove the contents to create the smaller storage container and provides an intuitive and easy opening mechanism for gaining access to the unconsumed portion of the product at a future time. The container also improves on prior designs through an easier to fold a seal flap and a locking system defined by a locking tab and a recess or slot that provides increased resistance to inadvertent opening of the reduced carton or container. The seal flap includes two side seals that provide a friction lock and seal for the reduced carton or container.

The container or the pizza box in the present invention can be snapped in half and the reusable rear carton component re-closed without even looking at it, since it eliminates the panels on the sides that require precise positioning in our previous U.S. Pat. No. 6,375,066. The folding is less complex in the present invention and is easier to close and open than the U.S. Pat. No. 6,375,066. The locking tab projecting through the recess in the reusable rear carton component can be engaged with the thumb or finger and simply pushed out of the recess to open the remaining portion, which then can be opened up and used as plate.

A comparison of the drawings of the several forms of the present invention with the disclosure in the U.S. Pat. No. 6,375,066 show that the differences between the container or the pizza box of the present invention and the box of U.S. Pat. No. 6,375,066 reside in the particular construction and mode of operation of the frangible lines and folds that enable a section of the box to be removed and the remaining section to be reclosed for storing an item contained therein. In U.S. Pat. No. 6,375,066, the removable section is separated from the remaining section along a straight line, whereas in the present invention the frangible line is shaped so that a recess and locking tab are formed. The recess is tapered so that as the locking tab is pushed into the recess upon closing the reusable rear carton component a tighter and more secure fit is obtained. Further, in U.S. Pat. No. 6,375,066 angled hinge lines 56, 58 form a web or gusset fold in the side panels when the remaining section is closed.

The U.S. Pat. No. 6,375,066 box must be grasped at precise locations and considerable force applied to close the remaining section after a part of the box has been removed. Moreover, because of the particular fold arrangement, reverse folding of the corrugated material must be accomplished to properly close the remaining section.

Accordingly, one aspect of the present invention is directed to a reducible carton formed from a one-piece unitary blank of material. The reducible carton comprises a top wall, a bottom wall, opposite side walls, a front wall and a back wall. Means enabling the reducible carton to transversely separate it into a reusable rear carton component and a discardable front carton component. The reusable carton component comprises the back wall and a rear portion of each of the top wall, the bottom wall and the side walls, wherein the rear top wall portion, the rear bottom wall portion and the rear side wall portions in the reusable carton component each terminate in a forward edge defining an open forward end of the reusable carton component. The forward edge of one of the rear top wall portion or the rear bottom wall portion defines a seal flap that is foldable into closing relationship over the open forward end of the reusable carton component. The seal flap has a locking tab on a free edge thereof. The forward edge of the other of the rear top wall portion or the rear bottom wall portion includes a recess therein for frictionally receiving the locking tab to lock the seal flap in closed position.

The means enabling the carton to be separated into the reusable carton component and the discardable carton component comprises a frangible line in each of the top wall and the bottom wall and the side walls foldably joined to both the top wall and bottom wall. Each of the side seals comprises narrow flanges foldably joined to opposite side edges of the seal flap. The means enabling the carton to be separated into the reusable carton component and the discardable carton component comprises a frangible line extending across the bottom wall and the side walls foldably joined to the bottom wall, and separate front and rear top wall portions having unattached free edges disposed adjacent one another, the frangible line and the free edges of the front and rear top wall portions being in substantial alignment with one another. The seal flap is formed on the forward edge of the bottom wall portion; and the recess is in the free edge of the rear top wall portion. Seal flap of the reusable rear carton component includes a height (H) and the side wall of the reusable rear carton component includes a height (h) and wherein the height (H) is greater than the height (h) in a manner that enables the seal flap being oriented in a forwardly slanted direction.

In another aspect of the present invention, a reduced sized carton separated from a larger carton, the reduced sized carton comprises a top wall, a bottom wall, opposite side walls, a front wall and a back wall all incorporate with one another to form an interior space. The top wall includes a recess formed therein and the front wall is configured to be defined by a seal flap wherein the seal flap has a locking tab engaged with the recess to enclose the reduced sized container. The seal flap comprises side seals formed on opposite side edges that frictionally engage adjacent inner surface of the opposite side walls. Each of the side seals comprises narrow flanges foldably joined to opposite side edges of the seal flap. The seal flap includes a height (H) and each of the side wall includes a height (h) wherein the height (H) is greater than the height (h) in a manner that enables the seal flap being oriented in a forwardly slanted direction. A further aspect of the present invention a carton comprises a top wall, a back wall, opposite side walls, and a bottom wall all incorporate with one another to form an interior space. A seal flap has a locking tab foldably joined to the bottom wall. A recess is formed on the top wall wherein the locking tab engaged with the recess to enclose the carton. The seal flap comprises side seals formed on opposite side edges that frictionally engage adjacent inner surface of the opposite side walls. Each of the side seals comprise narrow flanges foldably joined to opposite side edges of the seal flap.

Yet another aspect of the present invention is directed to a one-piece unitary blank for making a reducible carton that may be separated into a reusable component and a discardable component. The blank comprises a bottom wall panel having a front edge, a back edge, and opposite side edges. A top wall panel having a front edge, a back edge, and opposite side edges and a back wall panel are foldably connected between the back edges of the bottom wall panel and the top wall panel. A front wall panel is foldably connected to the front edge of the bottom wall panel. side wall panels are foldably connected to the opposite side edges of the top wall panel and the bottom wall panel. A first frangible line extends transversely across at least the bottom wall panel in spaced relation to the front and back edges thereof. The frangible line has an offset portion between opposite ends thereof that defines a locking tab when the bottom wall is separated along the frangible line. A second frangible line in the top wall panel defines a removable portion that forms a recess for receiving the locking tab when a carton is folded from the blank and the removable portion is removed along the frangible line. The top wall panel is substantially commensurate in length and width with the bottom wall panel; and the second frangible line extends across the top wall panel so that the top wall panel is divided into a rear top wall portion and a front top wall portion when the top wall panel is separated along the second frangible line. The top wall panel comprises a first top wall portion and a second top wall portion, the first top wall portion being foldably connected to the back wall panel and the second top wall portion being foldably connected to the front wall panel. The second frangible line is formed at a free edge of the first top wall portion. A fold line extends across the bottom wall panel in parallel spaced relation to the first frangible line defining a foldable seal flap therebetween, the seal flap having a free edge when the bottom wall panel is separated along the first frangible line, the locking tab projecting from the free edge.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
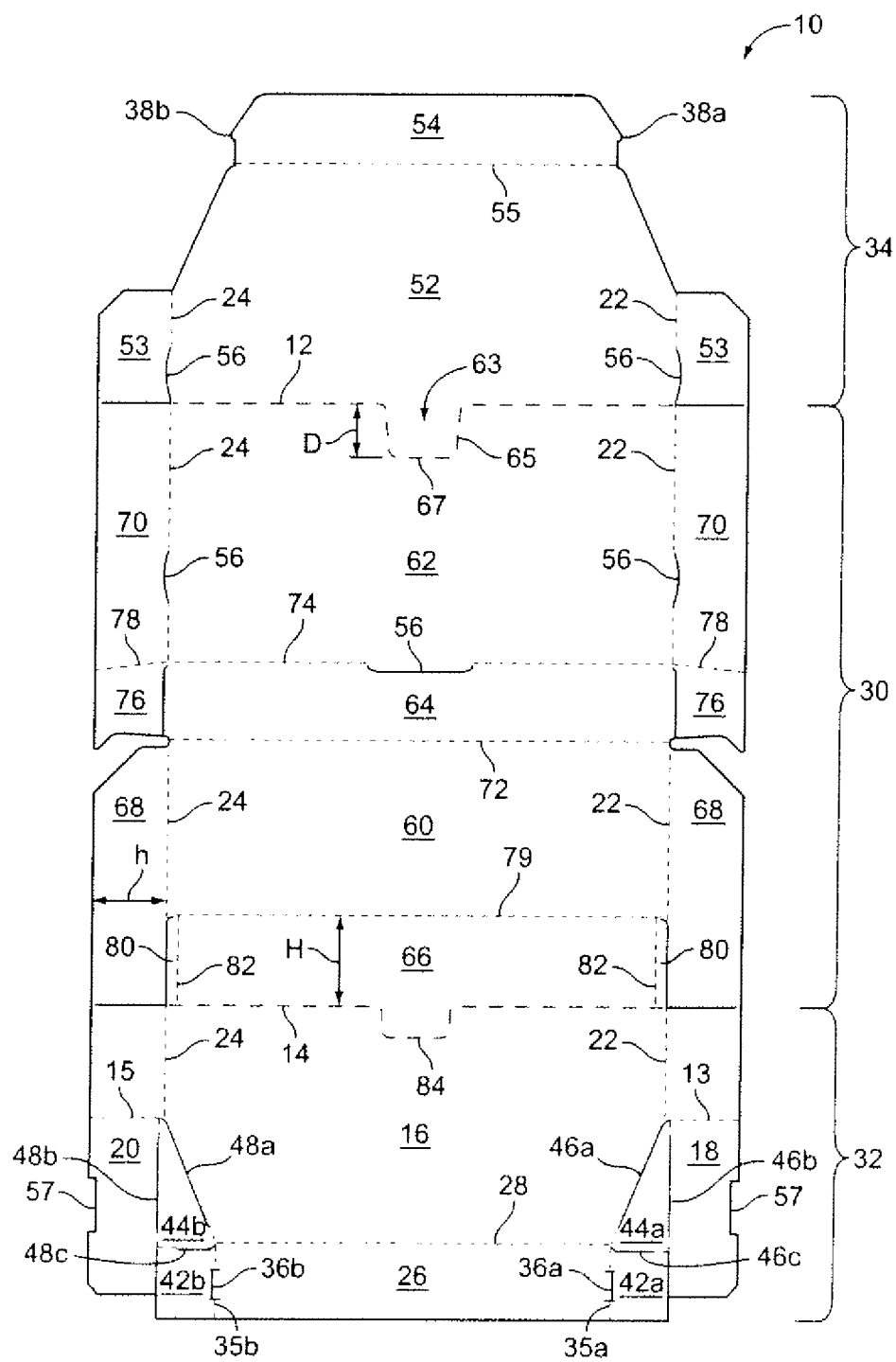
FIG. 1 is a plan view of a cut and scored paperboard blank for forming a reducible carton depicted in FIGS. 2A-2D in accordance to a first embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 is a plan view of a cut and scored paperboard blank 10 for forming a reducible carton 20 depicted in FIGS. 2A-2D in accordance to a first embodiment of the present invention. The blank 10 is substantially flat symmetrical with respect to its longitudinal axis thereof. The blank 10 is preferably an integral piece of a material such as continuous sheet of conventional corrugated cardboard. The blank 10 is cut along its outer margins to form its specific shape. The blank 10 is defined by three sections 30, 32, and 34 by two substantially parallel first and second frangible lines 12 and 14, respectively. Section 30 is defined by a reduced blank 30 as depicted in FIG. 3F when sections 32 and 34 are removed or separated along the first and second frangible lines 12 and 14, respectively.

Section 32 of the blank 10 includes a first lateral panel 16 having two opposed foldable side panels 18, 20 defined by respective fold lines 22, 24. The first lateral panel 16 also includes a front panel 26 defined by a fold line 28. Each of the side panels 18 and 20 includes a respective fold line 13 and 15 which permit a portion of the each side panel 18, 20 to be folded inwardly with respect to the front panel 26. The length of each of the side panels 18, 20 is less than the width of the panel 16 and terminates below the free edge of the front panel 26. Two generally square-shaped webs 42a, 42b are formed on the front panel 26 by fold lines 35a, 35b having two generally I-shaped slots 36a and 36b being formed thereon. The I-shaped slots 36a and 36b are used to engage with corresponding notches 38a, 38b to keep the container 20 in a secure closed position as will be described in greater detail hereinbelow. Two substantially identical triangles 44a, 44b are formed on the first lateral panel 16. Triangles 44a is defined by three cut lines 46a, 46b, 46c and triangle 44b is defined by three cut lines 48a, 48b, 48c. The triangles 44a, 44b are formed to permit a portion of the respective side panels 18 and 20 folded inwardly with respect to the front panel 26 when constructing the reducible carton 20 from blank 10.

As noted above, section 34 of the blank 10 is defined by first frangible line 12 and includes a second lateral panel 52 having a first closure flap 54 defined by fold line 55. The closure flap 54 includes two identical notches 38a, 38b on the short side which engaged with corresponding I-shaped slots 36a and 36b, on the front panel 26, when the blank 10 is constructed to form the container 20. The second lateral panel 52 also includes two identical ears 53 foldably joined along the respective fold lines 22, 24. When the blank 10 is constructed to form the reducible carton 20 depicted in FIGS. 2B and 2C, the ears 53 are respectively disposed adjacent to the side walls 18, 20 and prevent the second lateral panel 52 from collapsing inwardly on the food product. A plurality of cut outs 56 and 57 are formed on the blank 10 that helps to remove excess steam dissipated from flat food such as pizza (shown in FIGS. 3A & 3F) when the blank 10 is constructed to form the container 20. It should be appreciated that when boxing hot pizza, it is important to prevent a soggy product by letting moisture escape from the reducible container 20. While some moisture is released by the seams or gaps between the inside surfaces of the side panels and the lateral edges of the portion, the cut out 56, 57 are sized to further allow for venting of the moisture. With this design, the reducible container 20 is able to retain sufficient heat to keep the pizza at a desirable temperature while preventing condensation from forming thereon.

Figure 2D:
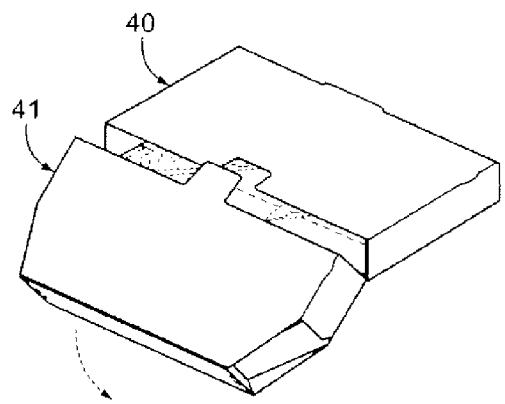
FIG. 2D is a top perspective view of the reducible carton shown in FIG. 2C illustrating a portion of the carton disengaged along two frangible lines.
Figure 3A:
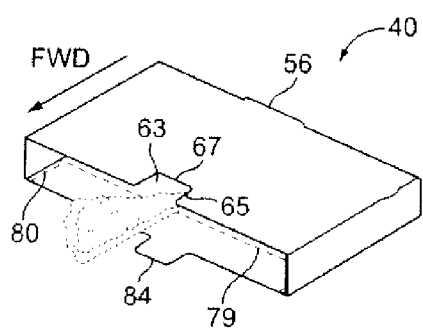
FIG. 3A is a top perspective view of a reduced carton in an open position used for packaging and storing pizza.
Figure 3B:
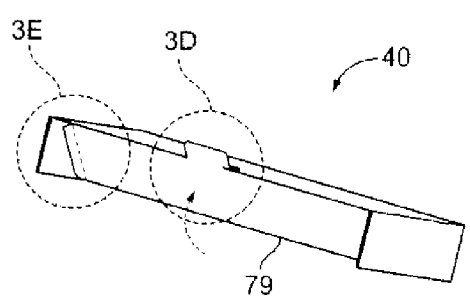
FIG. 3B illustrates the reduced carton shown in FIG. 3A in the closed position.
Figure 3C:
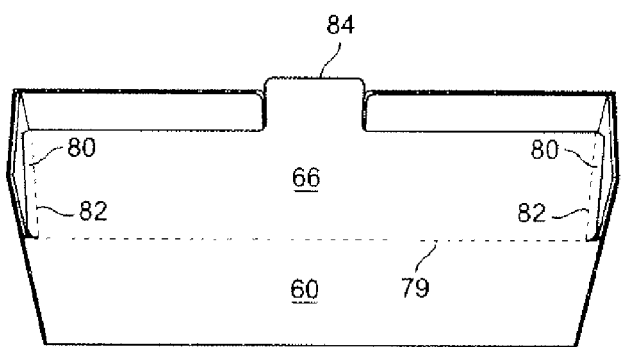
FIG. 3C is a bottom perspective view of the reduced carton in FIG. 3B illustrating a locking tab, a slot and a pair of seal flaps in their respective engaged positions in accordance to first embodiment of the present invention.
Figure 3D:
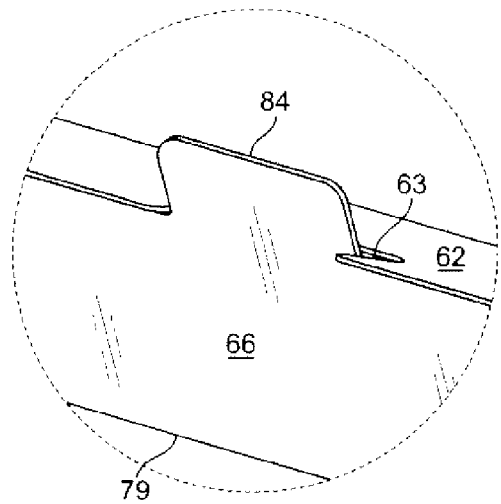
FIG. 3D is an enlarged view of a portion of FIG. 3B illustrating thumb tab and the slot in a locking position.
Figure 3E:
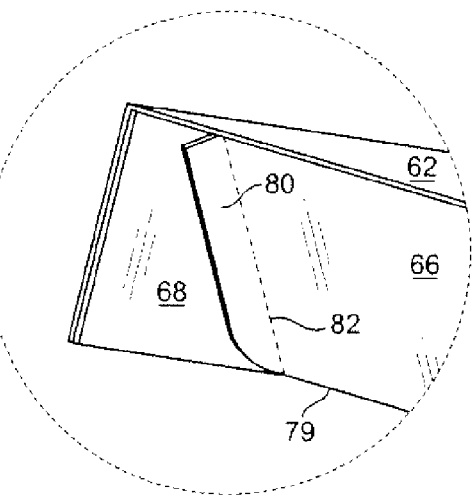
FIG. 3E is an enlarged view of a portion of FIG. 3B illustrating the seal flap having the side seals in an engaged position.
Figure 3F:
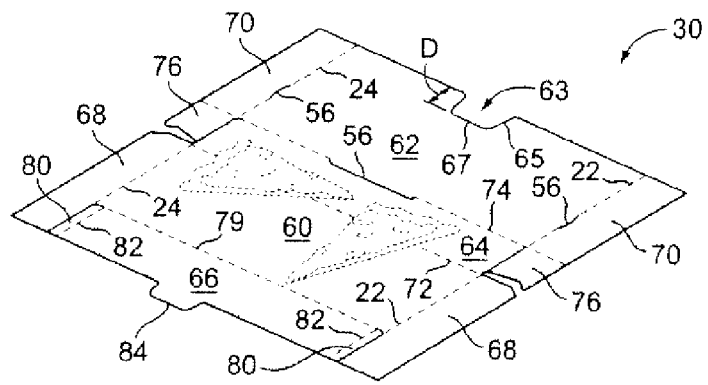
FIG. 3F is a portion of the blank shown in FIG. 1 used for forming the reduced carton depicted in FIGS. 3A-3C in accordance to first embodiment of the present invention.

Section 30 is defined by a reusable carton or reduced blank 30 as depicted in FIG. 3F when sections 32 and 34 are removed or separated along the respective first and second frangible lines 12 and 14. The sections 32 and 34 are removed after the reducible carton 20 is snapped in half as depicted in FIG. 2D. The reducible carton 20 is transversely separable into a reusable rear carton component and a discardable front carton component. The reduced blank 30 is pre-scored to define a base portion 60 for defining the bottom wall of the reusable rear carton component or reduced carton 40, a top portion 62 for defining the lid or top wall of the reusable rear carton component or reduced carton 40, a rear wall 64, a seal flap 66, first side walls 68, and second side walls 70. The base portion 60 and the top portion 62 are spaced apart from one another by the rear wall 64. The top portion 62 includes a recess 63 formed inwardly toward the center of the top portion 62 from the longitudinal edge side thereof and being located proximal mid portion of the top portion. The recess 63 is defined by a depth (D) and is generally trapezoid in shape having side edges 65 converges toward the center of the recess base portion 67. The rear wall 64 is defined by two parallel fold lines 72, 74. The second side walls 70 includes two identical flanges 76 defined by respective fold lines 78. The flanges 76 hold the side walls 70 firmly in the folded position and adjacent to the side walls 68. The seal flap 66 is defined by a fold line 79 on the base portion 60 and the second frangible line 14 and locking tab 84. The seal flap 66 includes two identical side seals 80 defined by respective fold lines 82 which enclosed the reduced container 40 constructed from the reduced blank 30. The side seal 80 comprises narrow flanges foldably joined to opposite side edges of the seal flap 66. The seal flap 66 also includes an integral outwardly extending locking tab 84 being located proximal mid portion of the seal flap 66.

Figure 2A:
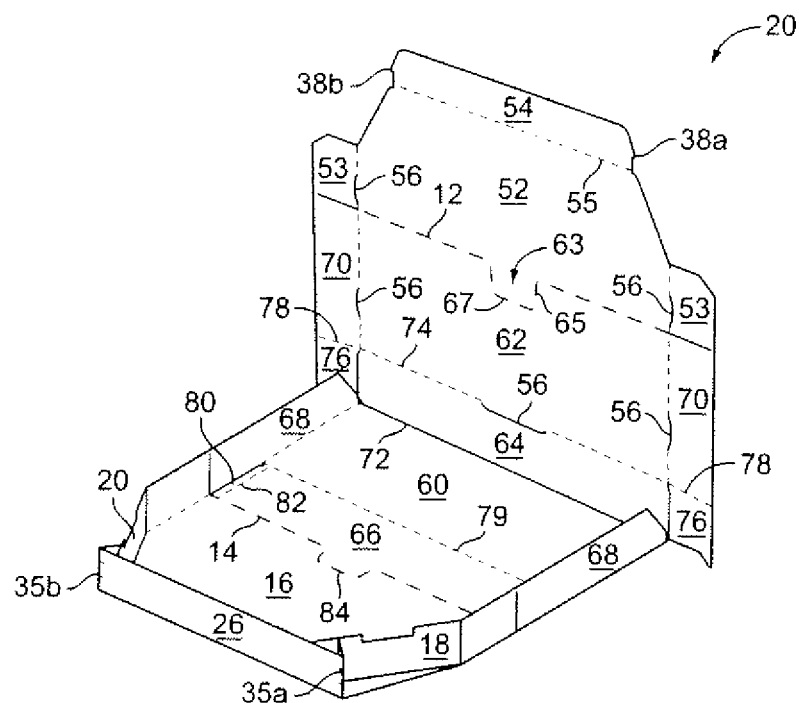
FIGS. 2A, 2B, and 2C illustrate the folding sequences of the blank shown in FIG. 1 for constructing the reducible carton in accordance to first embodiment of the present invention.
Figure 2B:
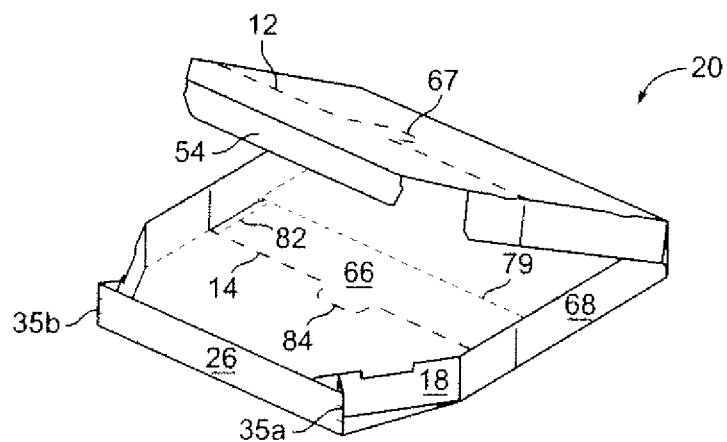
Figure 2C:
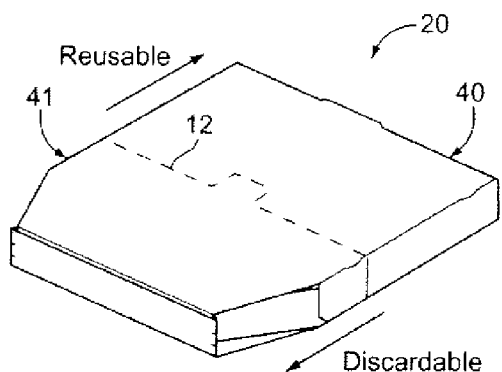

FIGS. 2A and 2B illustrate folding sequences of the blank 10 shown in FIG. 1 for constructing the reducible container 20 depicted in FIGS. 2C and 2D. It should be noted that the proper size and configuration of these panels are important to construct sections 30, 32, and 34 that are brought into juxtaposition with one another to form the reducible container 20 having the integrally formed therefrom the reusable rear carton or container 40.

Referring to FIGS. 2A, 2B, and 2C, manual set-up of the reducible container 20 is easily accomplished. However, an ordinary skilled in the art would appreciate that a folding machine may alternatively perform the forming operations. The blank 10 is laid horizontally; the first side walls 68, side panels 18, 20, and front panel 26 are folded upright along respective fold lines 22, 24 and 28. Next, the two flanges 76 are folded upright along fold line 78. Next, the second side walls 70 and the ears 53 are folded upright along respective fold lines 22, 24 in a manner in which the flanges 76 forms right angles with respect to the second side walls 70 and the ears 53. Then, the top portion or rear top wall portion 62, the second lateral panel 52 or the front top wall portion is folded upright with respect to fold line 74 such that the two flanges 76 are aligned contiguously with the rear wall 64 and then the first closure flap 54 is folded downright with respect to the fold line 55. Finally, the top portion or rear top wall portion 62, the second lateral panel 52 is folded over the base portion or rear bottom wall portion 60 and the first lateral panel 16 and the closure flap 54 is tucked in between the front panel 26 and the square-shaped webs 42a, 42b are formed thereto. The two identical notches 38a, 38b are now engaged with corresponding I-shaped slots 36a and 36b, on the front panel 26 to securely and tightly hold the reducible container 20 in closed position as best depicted in FIG. 2C.

After the food contents of the container are mostly consumed, the remaining food can be stored in the reduced container 40 when the reducible container 20 is reduced in size by breaking the container 20 along the first and second frangible lines 12 and 14 as illustrated in FIG. 2D. This is most easily accomplished by placing the assembled container at the edge of a countertop or other hard surface, and quickly snapping the front portion of the reducible container 20 downward. This motion breaks the container 20 along the frangible lines 12 and 14 into a reusable rear container or carton 40 and discardable front carton component 41 shown in FIG. 2D. With remaining food, for example pizza pie, in the reusable rear carton or container 40, the seal flap 66 is then folded upwardly along the fold line 79 and the locking tab 84 is pushed into the recess 63 and locked therein. Since the recess 63 is defined by a depth (D) and is generally trapezoid in shape having side edges 65 converges, then the width of the recess 63 is less than the width of the locking tab which permits the locking tab 84 be snugly fit into the recess 63 and remained locked therein. In addition, during folding of the seal flap 66 along the fold line 79, opposite side edges of the seal flap form side seals 80 are folded along fold lines 82 and frictionally engage adjacent inner surface of the side wall 68. These side seals form like narrow flanges that foldably joined to opposite side edges of the seal flap 66. The reduced container 40 may be easily opened or reclosed by pushing the tab 84 away from on into the recess 63, respectively. Using basic geometry, a designer may select from various shapes, sizes, and locations of the cuts and hinge lines to design a particular final orientation of the seal flap 66. In general, a seal flap having a height H (see FIG. 1) greater than the side panel height h will result in the seal flap being oriented in a forwardly slanted direction, such as that shown in FIG. 3B.

The second embodiment of the present invention is shown in FIGS. 4-6C. In this embodiment, like parts are labeled using like numbers with the addition of a single apostrophe. In essence, the first and second embodiments of the present invention with the various frangible lines, folds, and cuts are substantially similar and therefore, the function and operation of the container is the same.

Figure 4:
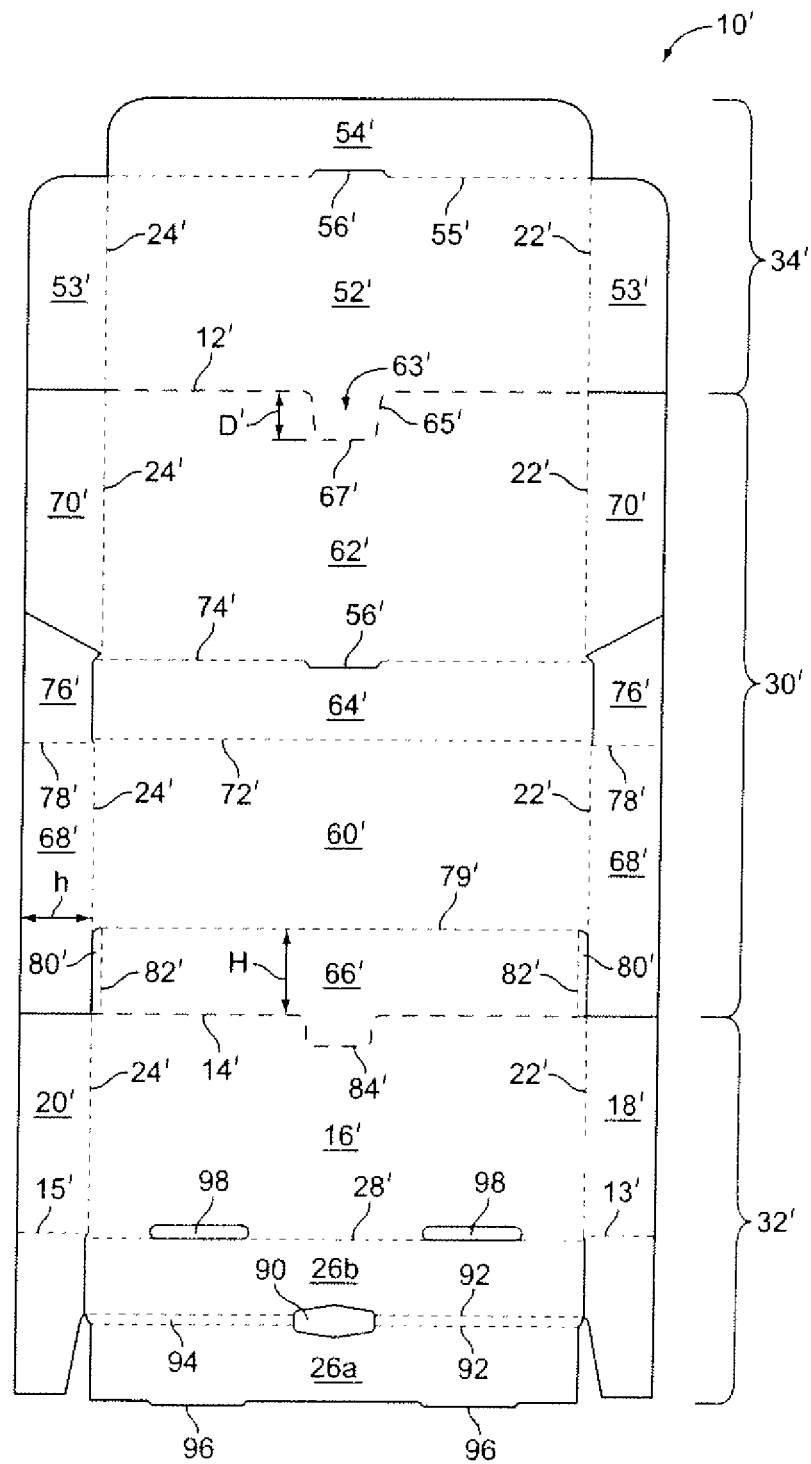
FIG. 4 is a plan view of a cut and scored paperboard blank for forming a reducible carton depicted in FIGS. 5A-5D in accordance to a second embodiment of the present invention.

FIG. 4 is a plan view of a cut and scored paperboard blank 10' for forming a reducible carton 20' depicted in FIGS. 5A-5D in accordance to a second embodiment of the present invention. The blank 10' is substantially flat symmetrical with respect to its longitudinal axis thereof. The blank 10' is preferably an integral piece of a material such as continuous sheet of conventional corrugated cardboard. The blank 10' is cut along its outer margins to form its specific shape. The blank 10' is defined by three sections 30', 32', and 34' by two substantially parallel frangible lines 12' and 14'. Section 30' is defined by a reduced blank 30' as depicted in FIG. 6C when sections 32' and 34' are removed or separated along the frangible lines 12' and 14'.

Section 32' of the blank 10' includes a first lateral panel 16' having two opposed foldable side panels 18', 20' defined by respective fold lines 22', 24'. The first lateral panel 16' also includes a similar front panel 26' defined by a fold line 28'. In the second embodiment, the front panel 26' is formed from first and second panels 26a, 26b by two parallel fold lines 92. An opening 90 is located proximal mid portion of the front panel 26' and when the first and second panels 26a, 26b are folded with respect to the fold lines 92, the opening 90 formed into a cut out 90'. In addition, a landing surface 94 is formed when first and second panels 26a, 26b are folded with respect to the fold lines 92. The longitudinal free edge of first panel 26a includes a pair of tabs 96 which engages with the slots 98 upon folding the first and second panels 26a, 26b along the fold lines 92 to construct the front wall 26'. Each of the side panels 18' and 20' includes a respective fold line 13' and 15' which permit a portion of the each side panel 18', 20' to be folded inwardly with respect to the front panel 26. These portions of each side panel 18', 20' are enclosed between first and second panels 26a, 26b.

As noted above, section 34' of the blank 10' is defined by the first frangible line 12' and includes a second lateral panel 52' having a first closure flap 54' defined by fold line 55'. The second lateral panel 52' includes two identical ears 53' foldably joined along the respective fold lines 22', 24'. When the blank 10' is constructed to form the reducible carton 20' depicted in FIGS. 5A and 5B, the ears 53' are respectively disposed adjacent to the side walls 18', 20' and prevent the second lateral panel 52' from collapsing inwardly on the food product. A plurality of cut outs 56' are formed on the blank 10' that helps to vent excess moist steam dissipated from flat food such as pizza when the blank 10' is constructed to form the container 20'. The excess moist steam is permitted to escape so that structural integrity or stiffness of container 20' is not compromised. With this design, the reducible container 20' is able to retain sufficient heat to keep the pizza (shown in FIGS. 3A & 3F) at a desirable temperature while preventing condensation from forming thereon.

Figure 5D:
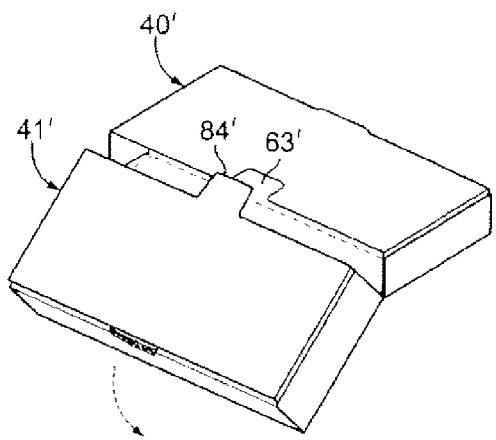
Figure 6A:
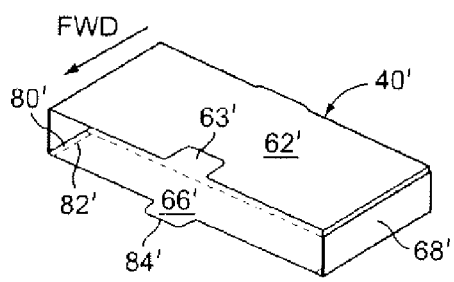
FIG. 6A is a top perspective view of a reduced carton in an open position used for packaging and storing pizza.
Figure 6B:
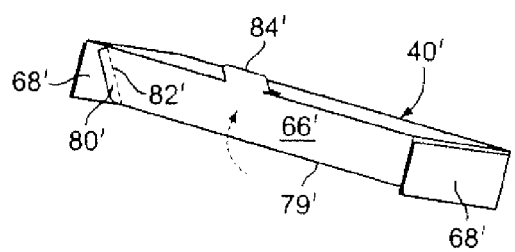
FIG. 6B is bottom perspective view of the reduced carton in FIG. 6B illustrating a locking tab, a slot and a pair of seal flaps in their respective engaged positions in accordance to second embodiment of the present invention.
Figure 6C:
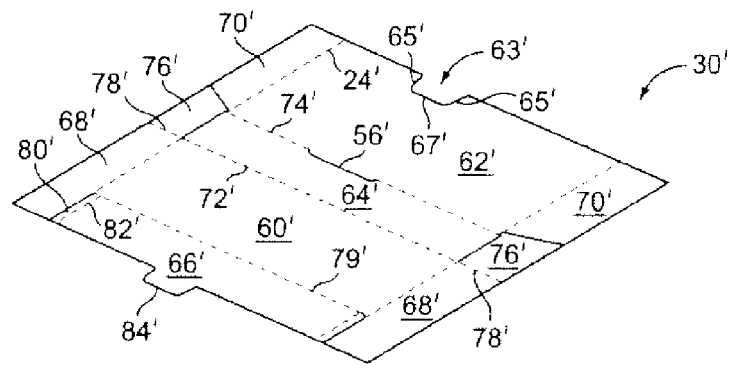
FIG. 6C is a portion of the blank shown in FIG. 4 used for forming the reduced carton depicted in FIGS. 6A-6B in accordance to second embodiment of the present invention.

Section 30' is defined by a reusable carton or reduced blank 30' as depicted in FIG. 6C when sections 32' and 34' are removed or separated along the respective first and second frangible lines 12' and 14'. The sections 32' and 34' are removed after the reducible carton 20' is snapped in half as depicted in FIG. 5D. The reducible carton 20' is transversely separable into a reusable rear carton component and a discardable front carton component. The reduced blank 30' prescored to define a base portion 60' for defining the bottom wall of the reusable rear carton component or reduced carton 40', a top portion 62' for defining the lid of the reduced carton 40', a rear wall 64', a seal flap 66', first side walls 68', and second side walls 70'. The base portion 60' and the top portion 62' are spaced apart from one another by the rear wall 64'. The top portion 62' includes a recess 63' formed inwardly toward the center of the top portion 62' from the longitudinal edge side thereof and being located proximal mid portion of the top portion 62'. The recess 63' is defined by a depth (D) and is generally trapezoid in shape having side edges 65' converges toward the center of the recess base portion 67'. The rear wall 64' is defined by two parallel fold lines 72', 74'. The first side walls 68' includes two identical flanges 76' defined by respective fold lines 78'. The flanges 76' hold the side walls 68' firmly in folded position and adjacent to the side walls 70'. The seal flap 66' is defined by a fold line 79' on the base portion 60' and the second frangible line 14' and locking tab 84'. The seal flap 66' includes two identical side seals 80' defined by respective fold lines 82' which enclosed the reduced container 40' constructed from the reduced blank 30'. The side seal 80' comprises narrow flanges foldably joined to opposite side edges of the seal flap 66'. The seal flap 66' also includes an integral outwardly extending locking tab 84' being located proximal mid portion of the seal flap 66'.

Figure 5A:
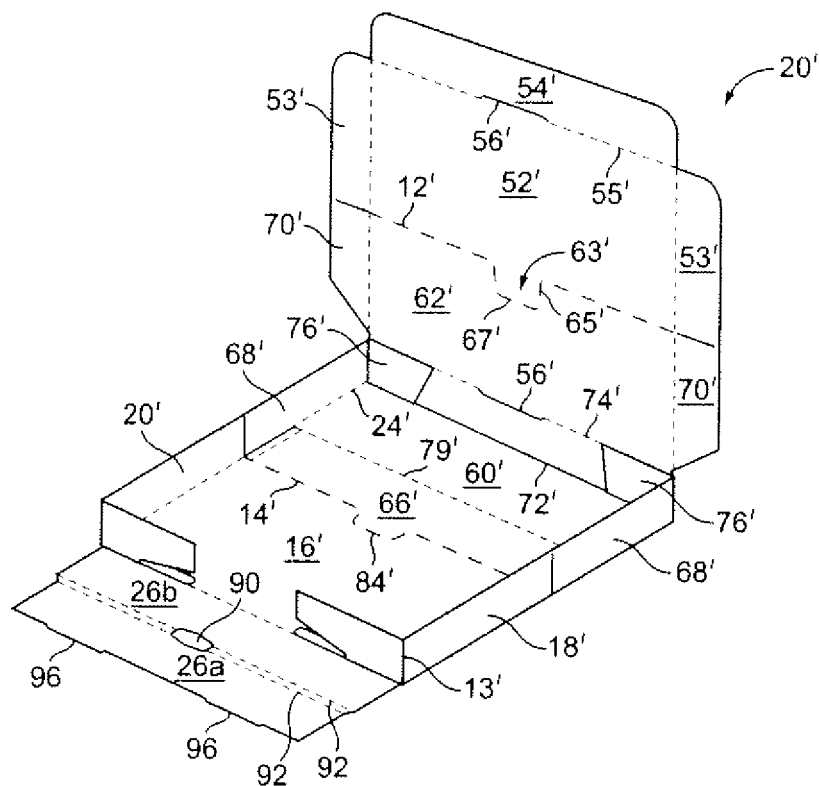
FIGS. 5A and 5B illustrate the folding sequences of the blank shown in FIG. 4 for constructing the reducible carton depicted in FIG. 5C in accordance to second embodiment of the present invention.
Figure 5B:
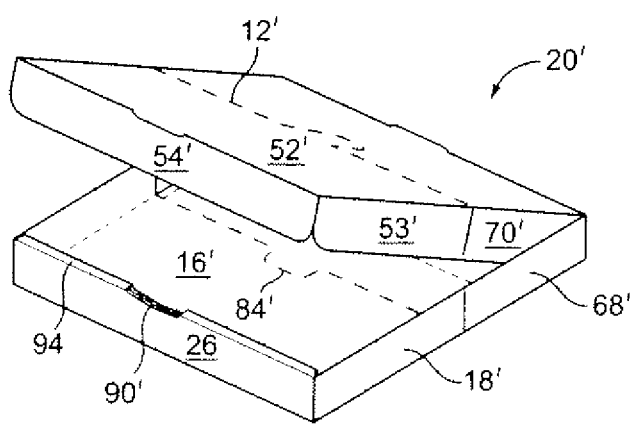
Figure 5C:
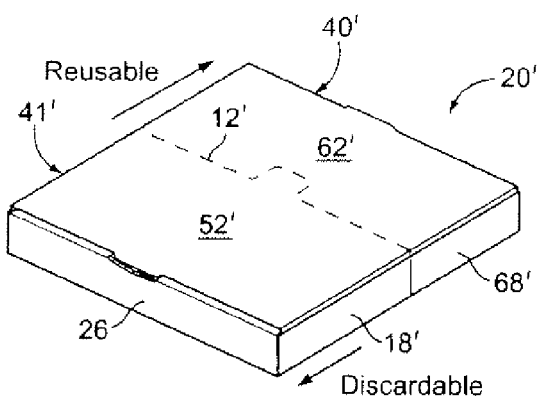
FIG. 5D is a top perspective view of the reducible carton shown in FIG. 5C illustrating a portion of the carton disengaged along the frangible lines.

FIGS. 5A and 5B illustrate folding sequences of the blank 10' shown in FIG. 4 for constructing the reducible container 20' depicted in FIGS. 5C and 5D. It should be noted that the proper size and configuration of these panels are important to construct sections 30', 32', and 34' that are brought into juxtaposition with one another to form the reducible container 20' having the integrally formed therefrom the reduced container 40'.

Referring to FIGS. 5A, 5B, and 5C, manual set-up of the container the reducible container 20' is easily accomplished. However, an ordinary skilled in the art would appreciate that a folding machine may alternatively perform the forming operations. The blank 10' is laid horizontally; the first side walls 68', side panels 18', 20' are folded upright along respective fold lines 22', and 24'. Next, a portion of each side panel 18', 20' is folded inwardly along fold lines 13', 15'. Then first and second front panels 25a' and 26b' are simultaneously folded upward along fold line 28'. Next, first front panel 26a' is folded over portions of side panel 18' and 20' along fold lines 92 with tabs 96 engaging in slots 98. Next, the two flanges 76' are folded at right angle along fold line 78' toward rear wall 64' and second side walls 70', the ears 53' are folded upright along respective fold lines 22', 24' in a manner in which the flanges 76' forms right angles with respect to the second side walls 70' and the ears 53'. Then, the top portion 62', the second lateral panel 52' is folded upright with respect to fold line 74' such that the two flanges 76' are aligned contiguously with the rear wall 64 and then the first closure flap 54' is folded downright with respect to the fold line 55'. Finally, the top portion 62', the second lateral panel 52' is folded over the base portion 60' and the first lateral panel 16' and the closure flap 54' is tucked in against the front wall 26' to securely and tightly hold the reducible container 20' in closed position as best depicted in FIG. 5C.

After the food contents of the container are mostly consumed, the remaining food can be stored in the reduced container 40' when the reducible container 20' is reduced in size by breaking the container 20' along the first and second fungible lines 12' and 14' as illustrated in FIG. 5D. This is most easily accomplished by placing the assembled container at the edge of a countertop or other hard surface, and quickly snapping the front portion of the container 20' downward. This motion breaks the container 20' along the frangible lines 12' and 14' into a reusable rear container or carton 40' and discardable front carton component 41' shown FIG. 6A. With the remaining food, for example pizza pie, in the reduced container 40', the seal flap 66' is then folded upwardly along the fold line 79' and the locking tab 84' is pushed into the recess 63' and locked therein. Since the recess 63' is defined by a depth (D) and is generally trapezoid in shape having side edges 65' converges, then the width of the recess 63' is less than the width of the locking tab which permits the locking tab 84' be snugly fit into the recess 63' and remained locked therein. In addition, during folding of the seal flap 66' along the fold line 79', opposite side edges of the seal flap forms side seals 80 are folded along fold lines 82' and frictionally engage adjacent inner surface of the side wall 68'. These side seals 80 form like narrow flanges that foldably joined to opposite side edges of the seal flap 66'. The reduced container 40' may be easily opened or reclosed by pushing the tab 84' away from on into the recess 63', respectively. Using basic geometry, a designer may select from various shapes, sizes, and locations of the cuts and hinge lines to design a particular final orientation of the seal flap 66'. In general, a seal flap having a height (H) (see FIG. 4) greater than the side panel height (h) will result in the seal flap being oriented in a forwardly slanted direction, such as that shown in FIG. 6B.

Figure 9A:
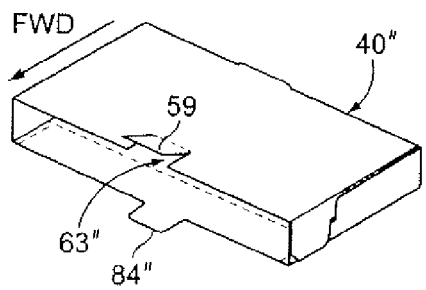
FIG. 9A is a top perspective view of a reduced carton in an open position used for packaging and storing pizza.
Figure 9B:
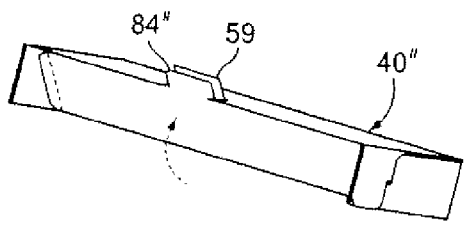
FIG. 9B is bottom perspective view of the reduced carton in FIG. 9A illustrating a thumb tab, a slot and a pair of seal flaps in their respective engaged positions in accordance to the third embodiment of the present invention.

A third embodiment of the present invention is shown in FIGS. 9-11, with previously described parts being labeled with like numbers and double apostrophe. This third embodiment has only one frangible line, but utilized the overlapping top lateral panels 52" and 62" to further reduce the effort required to separate the reusable and discardable portions of the reducible container. As above, this improvement may be applied to numerous types of known cartons and may be accomplished on either the upper or lower lateral panels.

The blank 10" is divided into two sections 30", 32" by the second frangible line 14". Section 32" includes a first lateral panel 16" and a second lateral panel 52" spaced out from one another by a front panel 26". The front panel 26" is defined by two parallel fold lines 28", 55". The first lateral panel 16" includes two opposed foldable side panels 18", 20" defined by respective fold lines 22", 24". The first lateral panel 16" also includes a front panel 26" defined by a fold line 28". Each of the side panels 18" and 20" includes a flange 76" defined by a respective fold lines 13" and 15" which permit the flanges 76" to be folded inwardly with respect to the front panel 26". The second lateral panel 52" includes two identical ears 53" foldably joined along the respective fold lines 22", 24". When the blank 10" is constructed to form the reducible carton 20" depicted in FIGS. 8A and 8B, the ears 53" are respectively disposed adjacent to the side walls 18", 20" and prevent the second lateral panel 52" from collapsing inwardly on the food product. A plurality of cut outs 56" are formed on the blank 10" that helps to vent excess moist steam dissipated from flat food such as pizza when the blank 10" is constructed to form the container 20". A plurality of cut outs 56b" are formed on the blank 10" to assist in holding top lateral panel 52" parallel to bottom lateral panel 16" while the carton is being formed.

Figure 8D:
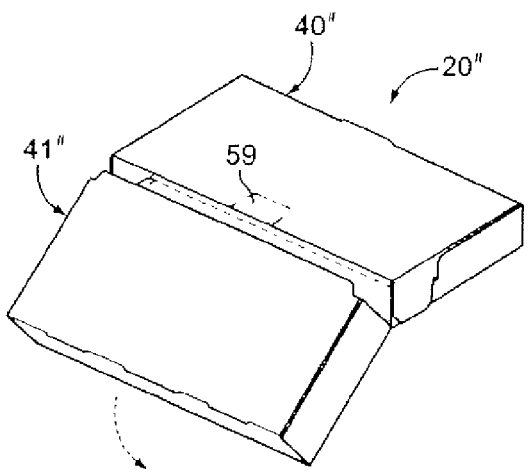
Figure 9C:
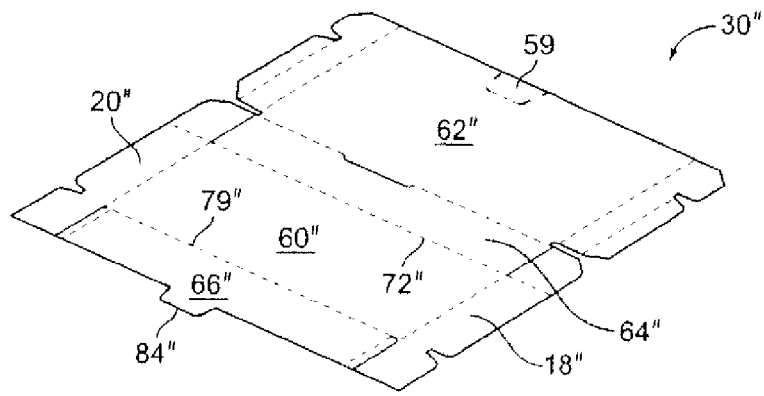
FIG. 9C is a portion of the blank shown in FIG. 7 used for forming the reduced carton depicted in FIGS. 9A-9B in accordance to the third embodiment of the present invention.

Section 30" is defined by a reduced blank 30" as depicted in FIG. 9C when section 32" is removed or separated along the second frangible line 14". The sections 32" is removed after the reducible carton 20" is snapped in half as depicted in FIG. 8D. The reduced blank 30" pre-scored to define a base portion or the rear bottom wall 60" for defining the bottom of the reduced carton 40", a top portion 62" for defining the lid of the reduced carton 40", a rear wall 64", a seal flap 66", first side walls 68", and second side walls 70". The base portion 60" and the top portion 62" are spaced apart from one another by the rear wall 64". The top portion 62" includes recess tab 59 that folds along fold line 67" to form a recess 63" formed inwardly toward the center of the top portion 62" from the longitudinal edge side thereof and being located proximal mid portion of the base portion 62". The recess 63" is defined by a depth (D) and is generally trapezoid in shape having side edges 65" converges toward the center of the recess base portion 67". The rear wall 64" is defined by two parallel fold lines 72", 74". Each of the first side wall 68" and second side wall 70" includes a pair identical interlocking openings 95 that permits first side wall 68" and second side wall 70" engages with one another to enclose the top portion 62" with the base portion 60" when the blank 10" is constructed to form the reducible container 20". A pair of fold lines 93 are formed on the second side wall 70" so that a portion of the second side wall 70" is urged inwardly to enable the interlocking openings 95 frictionally engages the first side wall 68" and second side wall 70" with one another. The first side walls 68" includes two identical flanges 76" defined by respective fold lines 78". The flanges 76" hold the side walls 68" firmly in the folded position. The seal flap 66" is defined by a fold line 79" on the base portion 60" and the second frangible line 14". The seal flap 66" includes two identical side seals 80" defined by respective fold lines 82" which enclosed the reduced container 40" constructed from the reduced blank 30". The seal flap 66" also includes an integral outwardly extending locking tab 84" being located proximal mid portion of the seal flap 66".

Figure 8A:
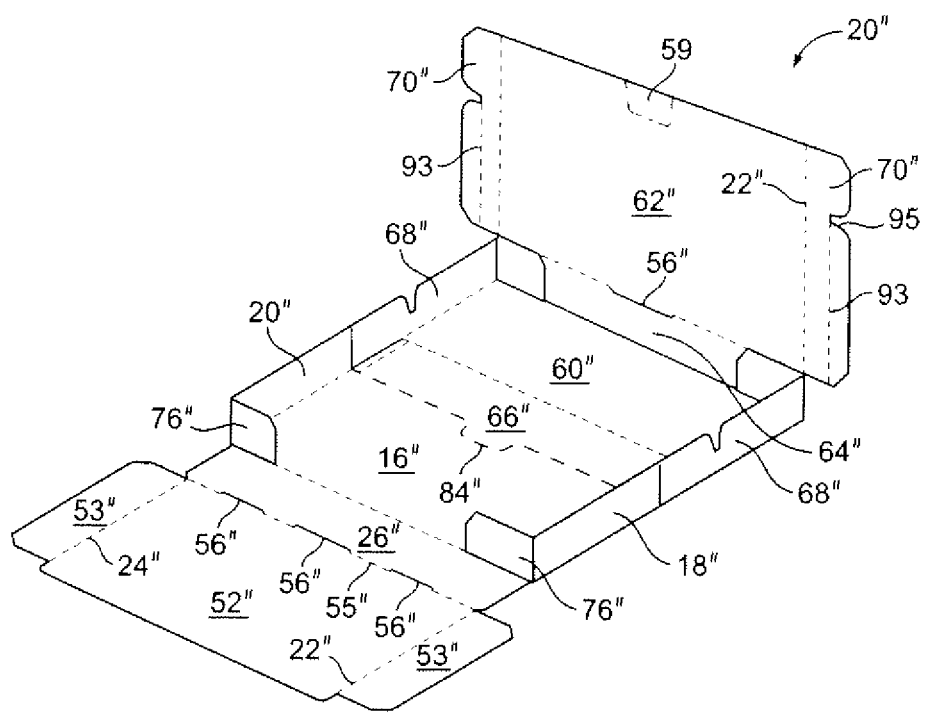
FIGS. 8A and 8B illustrate the folding sequences of the blank shown in FIG. 7 for constructing the reducible carton depicted in FIG. 8C in accordance to a third embodiment of the present invention.
Figure 8B:
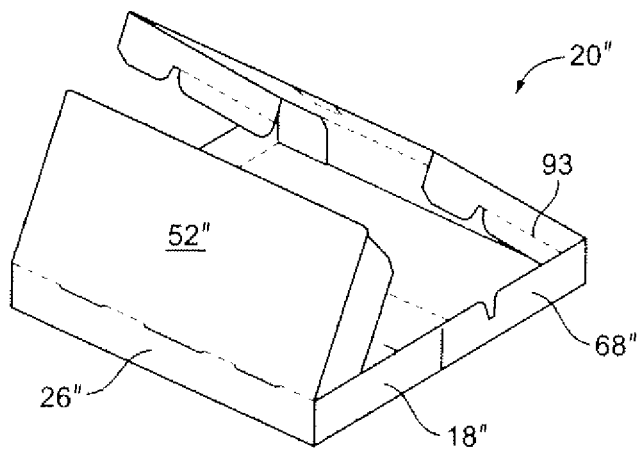
Figure 8C:
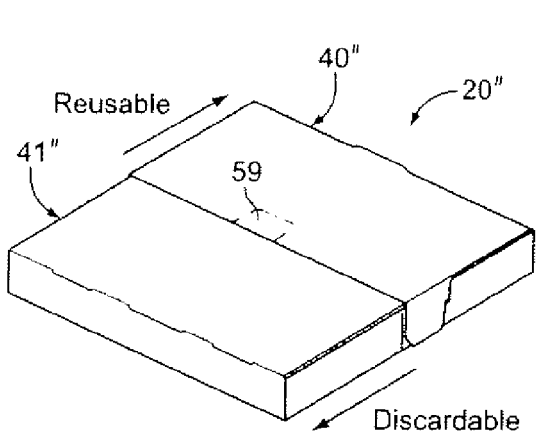
FIG. 8D is a top perspective view of the reducible carton shown in FIG. 5C illustrating a portion of the carton disengaged along one frangible line.

Referring to FIGS. 8A, 8B, and 8C, manual set-up of the container the reducible container 20" is easily accomplished. However, an ordinary skilled in the art would appreciate that a folding machine may alternatively perform the forming operations. The blank 10" is laid horizontally; the first side walls 68", an side panels 18", 20" are folded upright along respective fold lines 22', 24" and the four flanges 76" are folded inward at right angle along fold line 78", 13", 15" toward panels 60", 16". Next, the front panel 26" and the second lateral panel 52" are simultaneously folded upright along the fold line 28" and the ears 53" are folded at the right angle along respective fold lines 22", 24" in a manner in which the flanges 76" and the front panel 26" are adjacent with one another once the second lateral panel 52" enclosed is folded along fold line 55" forming a portion of the reducible container 20". Next, rear panel 64" and top lateral panel 62" are simultaneously folded upright along fold line 72" such that flanges 76" and the rear panel 64" are adjacent to one another. Finally, the top portion 62" is folded over the base portion 60" and a portion of the second side wall 70" is urged inwardly to enable the interlocking openings 95 frictionally engages the first side wall 68" and second side wall 70" with one another.

Figure 7:
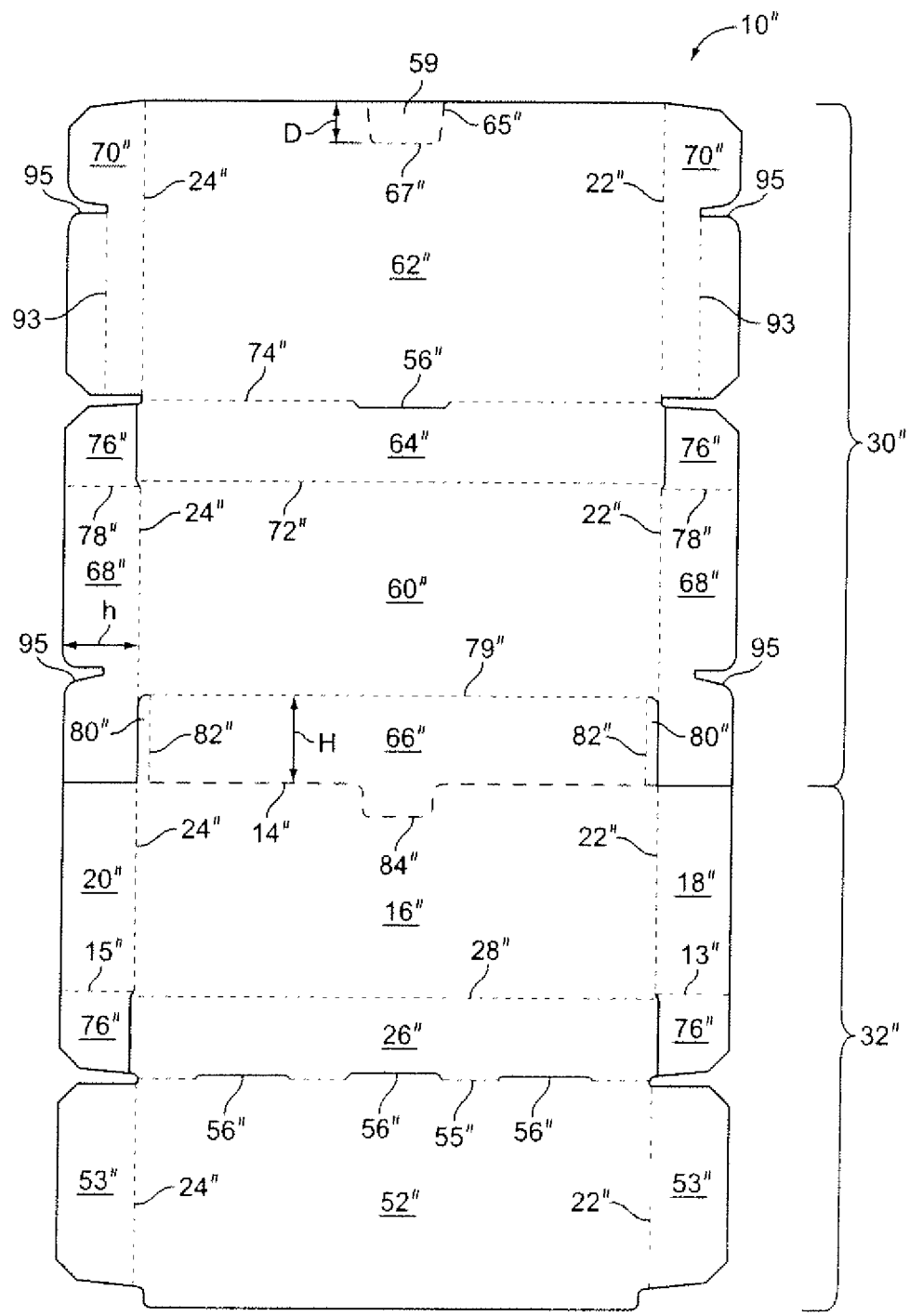
FIG. 7 is a plan view of a cut and scored paperboard blank for forming a reducible carton depicted in FIGS. 8A-8D in accordance to a third embodiment of the present invention.

After the food contents of the container are mostly consumed, the remaining food can be stored in the container 20" when the container is reduced in size by breaking the container 20" along the second frangible line 14" as illustrated in FIG. 8D. This is most easily accomplished by placing the assembled container at the edge of a countertop or other hard surface, and quickly snapping the front portion of the container 20" downward. This motion breaks the container 20" along the frangible line 14", resulting in the reduced container 40" shown in FIG. 9A. With the remaining food, for example pizza pie, in the reduced container 40", the seal flap 66" is then folded along the fold line 79" and the locking tab 84" is pushed into recess tab 59 to fold upward along fold line 67" forming the recess 63" and locked therein. Since the recess 63" is defined by a depth (D) and is generally trapezoid in shape having side edges 65" converges, then the width of the recess 63" is less than the width of the locking tab which permits the locking tab 84" be snugly fit into the recess 63" and remained locked therein. In addition, during folding of the seal flap 66" along the fold line 79", opposite side edges of the seal flap forms side seals 80" are folded along fold lines 82" and frictionally engage adjacent inner surface of the side wall 68". These side seals forms like narrow flanges that foldably joined to opposite side edges of the seal flap 66". The reduced container 40" may be easily opened or reclosed by pushing the tab 84" away from recess 63', respectively. Using basic geometry, a designer may select from various shapes, sizes, and locations of the cuts and hinge lines to design a particular final orientation of the seal flap 66". In general, a seal flap having a height (H) (see FIG. 7) greater than the side panel height (h) will result in the seal flap being oriented in a forwardly slanted direction, such as that shown in FIG. 9B.

In sum, in one aspect of the present invention is directed to a reducible carton formed from a one-piece unitary blank of material. The reducible carton comprises a top wall, a bottom wall, opposite side walls, a front wall and a back wall. Means enabling the reducible carton to transversely separate it into a reusable rear carton component and a discardable front carton component. The reusable carton component comprises the back wall and a rear portion of each of the top wall, the bottom wall and the side walls, wherein the rear top wall portion, the rear bottom wall portion and the rear side wall portions in the reusable carton component each terminate in a forward edge defining an open forward end of the reusable carton component. The forward edge of one of the rear top wall portion or the rear bottom wall portion defines a seal flap that is foldable into closing relationship over the open forward end of the reusable carton component. The seal flap has a locking tab on a free edge thereof. The forward edge of the other of the rear top wall portion or the rear bottom wall portion includes a recess therein for frictionally receiving the locking tab to lock the seal flap in closed position. The means enabling the carton to be separated into the reusable carton component and the discardable carton component comprises a frangible line extending transversely across at least the carton bottom wall and the side walls foldably joined to the bottom wall. The opposite side edges of the seal flap form side seals that frictionally engage adjacent inner surfaces of the sidewall portions.

The means enabling the carton to be separated into the reusable carton component and the discardable carton component comprises a frangible line in each of the top wall and the bottom wall and the side walls foldably joined to both the top wall and bottom wall. Each of the side seals comprises narrow flanges foldably joined to opposite side edges of the seal flap. The means enabling the carton to be separated into the reusable carton component and the discardable carton component comprises a frangible line extending across the bottom wall and the side walls foldably joined to the bottom wall, and separate front and rear top wall portions having unattached free edges disposed adjacent one another, the frangible line and the free edges of the front and rear top wall portions being in substantial alignment with one another. The seal flap is formed on the forward edge of the bottom wall portion; and the recess is in the free edge of the rear top wall portion. Seal flap of the reusable rear carton component includes a height (H) and the side wall of the reusable rear carton component includes a height (h) and wherein the height (H) is greater than the height (h) in a manner that enables the seal flap being oriented in a forwardly slanted direction.

In another aspect of the present invention, a reduced sized carton separated from a larger carton, the reduced sized carton comprises a top wall, a bottom wall, opposite side walls, a front wall and a back wall all incorporate with one another to form an interior space. The top wall includes a recess formed therein and the front wall is configured to be defined by a seal flap wherein the seal flap has a locking tab engaged with the recess to enclose the reduced sized container. The seal flap comprises side seals formed on opposite side edges that frictionally engage adjacent inner surface of the opposite side walls. Each of the side seals comprises narrow flanges foldably joined to opposite side edges of the seal flap. The seal flap includes a height (H) and each of the side wall includes a height (h) wherein the height (H) is greater than the height (h) in a manner that enables the seal flap being oriented in a forwardly slanted direction. A further aspect of the present invention a carton comprises a top wall, a back wall, opposite side walls, and a bottom wall all incorporate with one another to form an interior space. A seal flap has a locking tab foldably joined to the bottom wall. A recess is formed on the top wall wherein the locking tab engaged with the recess to enclose the canon. The seal flap comprises side seals formed on opposite side edges that frictionally engage adjacent inner surface of the opposite side walls. The side seals comprise narrow flanges foldably joined to opposite side edges of the seal flap.

Yet another aspect of the present invention is directed to a one-piece unitary blank for making a reducible carton that may be separated into a reusable component and a discardable component. The blank comprises a bottom wall panel having a front edge, a back edge, and opposite side edges. A top wall panel having a front edge, a back edge, and opposite side edges and a back wall panel is foldably connected between the back edges of the bottom wall panel and the top wall panel. A front wall panel is foldably connected to the front edge of the bottom wall panel. side wall panels are foldably connected to the opposite side edges of the top wall panel and the bottom wall panel. A first frangible line extends transversely across at least the bottom wall panel in spaced relation to the front and back edges thereof. The frangible line has an offset portion between opposite ends thereof that defines a locking tab when the bottom wall is separated along the frangible line. A second frangible line in the top wall panel defines a removable portion that forms a recess for receiving the locking tab when a carton is folded from the blank and the removable portion is removed along the frangible line. The top wall panel is substantially commensurate in length and width with the bottom wall panel; and the second frangible line extends across the top wall panel so that the top wall panel is divided into a rear top wall portion and a front top wall portion when the top wall panel is separated along the second frangible line. The top wall panel comprises a first top wall portion and a second top wall portion, the first top wall portion being foldably connected to the back wall panel and the second top wall portion being foldably connected to the front wall panel. The second frangible line is formed at a free edge of the first top wall portion. A fold line extends across the bottom wall panel in parallel spaced relation to the first frangible line defining a foldable seal flap therebetween, the seal flap having a free edge when the bottom wall panel is separated along the first frangible line, the locking tab projecting from the free edge.

From the foregoing, it should be understood that the preferred use of the blanks 10, 10', and 10" facilitate a highly efficient and economic food packaging operation in comparison with prior art pizza packaging. Use of the present invention eliminates the prior art handling steps of pre-erecting a carton, stacking multiple pre-erected cartons on a shelf, removing a pre-erected carton from the shelf, opening the pre-erected carton, placing the pizza on a counter surface for cutting after being removed from the oven, moving the cut pizza (which may have since cooled) to the open carton and then re-closing the carton. In addition, loading the pizza directly from the oven reduces labor costs and prevents potential contamination from the counter surface.

It should now be appreciated that the present invention provides a material-saving, quickly erected carton especially useful in retaining, transporting and serving hot, flat food such as pizza, by way of example. The reduced containers 40, 40', and 40" are designed with inwardly slanting seal flaps having a locking tab engaged with a recess. As described above, the structure of the rear panels, the side panels, the front panels, base portion panel, and top portion panel enhance the rigidity, stackability, venting capability and manufacturing cost effectiveness of the reducible container. The blank used to form the reducible container has a symmetrical design, which reduces erecting and closing labor. The lay flat design of the blank speeds the cutting and packaging process and facilitates easy serving. Furthermore, the blank promotes direct loading of the pizza from the oven, which further reduces labor and lessens potential contamination. Placing the pizza on the blank and erecting the reducible container around the pizza eliminates the need for pre-erecting the carton, opening the carton, loading the pizza and then reclosing the carton.

Numerous modifications and variations on the present invention are possible in light of the above teachings. It is, therefore, to be understood that within the scope of the accompanying claims, the invention may be practiced otherwise than as specifically described herein.

It should be understood that fold lines and score line as used herein may be used interchangeably so long as the function of the line is not destroyed.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A reducible carton formed from a one-piece unitary blank of material, the reducible carton comprising:
   a top wall, a bottom wall, opposite side walls, a front wall and a back wall;
   means enabling the reducible carton to be transversely separable into a reusable rear carton component and a discardable front carton component;
   the reusable carton component comprising the back wall and a rear portion of each of the top wall, the bottom wall and the side walls, wherein the rear top wall portion, the rear bottom wall portion and the rear side wall portions in the reusable carton component each terminate in a forward edge defining an open forward end of the reusable carton component;
   the forward edge of one of the rear top wall portion or the rear bottom wall portion defining an oblique angled seal flap thereto that is foldable into closing relationship over the open forward end of the reusable carton component, opposite side edges of the oblique angled seal flap form side seals that frictionally engage adjacent inner surfaces of the side walls portions wherein the side seals comprise narrow flanges foldably joined to opposite side edges of the seal flap, the seal flap having a locking tab on a free edge thereof; and
   the forward edge of the other of the rear top wall portion or the rear bottom wall portion having a recess therein for frictionally receiving the locking tab to lock the seal flap in closed position, the recess being formed on an outer free edge of the top or bottom wall panel and wherein the locking tab being obliquely positioned within the recess.

2. The reducible carton of claim 1, wherein the means enabling the carton to be separated into the reusable carton component and the discardable carton component comprises a frangible line extending transversely across at least the carton bottom wall and the side walls foldably joined to the bottom wall.

3. The reducible carton of claim 2, wherein the means enabling the carton to be separated into the reusable carton component and the discardable carton component comprises a frangible line in each of the top wall and the bottom wall and the side walls foldably joined to both the top wall and bottom wall.

4. The reducible carton of claim 1, wherein the means enabling the carton to be separated into the reusable carton component and the discardable carton component comprises a frangible line extending across the bottom wall and the side walls foldably joined to the bottom wall, and separate front and rear top wall portions having unattached free edges disposed adjacent one another, the frangible line and the free edges of the front and rear top wall portions being in substantial alignment with one another.

5. The reducible carton of claim 4, wherein the seal flap is formed on the forward edge of the bottom wall portion; and the recess is in the free edge of the rear top wall portion.

6. The reducible carton of claim 1, wherein the seal flap of the reusable rear carton component includes a height (H) and the side wall of the reusable rear carton component includes a height (h) and wherein the height (H) is greater than the height (h) in a manner that enables the seal flap being oriented in a forwardly slanted direction.

7. A reduced sized carton separated from a larger carton, the reduced sized carton comprising:
a top wall, a bottom wall, opposite side walls, a front wall and a back wall all incorporate with one another to form an interior space, the top wall having a recess formed therein, the recess being formed on an outer free edge of the top or bottom wall and the front wall configured to be defined by a seal flap comprises side seals formed on opposite side edges that frictionally engage adjacent inner surface of the opposite side walls wherein the side seals comprises narrow flanges foldably joined to opposite side edges of the seal flap and wherein the seal flap having a locking tab being obliquely positioned within the recess to enclose the reduced sized container.

8. The reduced sized container of claim 7 wherein the seal flap includes a height (H) and each of the side walls includes a height (h) wherein the height (H) is greater than the height (h) in a manner that enables the seal flap being oriented in a forwardly slanted direction.

9. A carton comprising:
a top wall, a back wall, opposite side walls, and a bottom wall all incorporate with one another to form an interior space;
an oblique angled seal flap with respect to the opposite side walls and having a locking tab foldably joined to the bottom wall wherein the seal flap comprises side seals formed on opposite side edges that frictionally engage adjacent inner surface of the opposite side walls and wherein the side seals comprises narrow flanges foldably joined to opposite side edges of the seal flap;
a recess being formed on the top wall, the recess being formed on an outer free edge of the top or bottom wall panel wherein the locking tab being obliquely positioned within the recess to enclose the carton.

10. A one-piece unitary blank for making a reducible carton that may be separated into a reusable component and a discardable component, the blank comprising:
a bottom wall panel having a front edge, a back edge, and opposite side edges;
a top wall panel having a front edge, a back edge, and opposite side edges;
a back wall panel foldably connected between the back edges of the bottom wall panel and the top wall panel;
a front wall panel foldably connected to the front edge of the bottom wall panel;
side wall panels foldably connected to the opposite side edges of the top wall panel and the bottom wall panel;
a first frangible line extending transversely across at least the bottom wall panel in spaced relation to the front and back edges thereof, the frangible line having an offset portion between opposite ends thereof that defines a locking tab when the bottom wall is separated along the frangible line wherein a fold line extends across the bottom wall panel in parallel spaced relation to the first frangible line defining a foldable seal flap therebetween, the seal flap having a free edge when the bottom wall panel is separated along the first frangible line, the locking tab projecting from the free edge; and
a second frangible line in the top wall panel defining a removable portion that forms a recess on an outer free edge of top or bottom wall panel for receiving the locking tab when a carton is folded from the blank and the removable portion is removed along the frangible line.

11. The blank of claim 10, wherein the top wall panel is substantially commensurate in length and width with the bottom wall panel; and the second frangible line extends across the top wall panel so that the top wall panel is divided into a rear top wall portion and a front top wall portion when the top wall panel is separated along the second frangible line.

12. The blank of claim 11, wherein the second frangible line is formed at a free edge of the first top wall portion.

13. The blank of claim 10, wherein the top wall panel comprises a first top wall portion and a second top wall portion, the first top wall portion being foldably connected to the back wall panel and the second top wall portion being foldably connected to the front wall panel.

* * * * *